United States Patent
Shah

(10) Patent No.: US 10,560,581 B1
(45) Date of Patent: Feb. 11, 2020

(54) SPLIT BILLING FOR A USER ACROSS MULTIPLE BILLING SYSTEMS

(71) Applicant: T-Mobile USA, Inc., Bellevue, WA (US)

(72) Inventor: Mehul Shah, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/058,956

(22) Filed: Aug. 8, 2018

(51) Int. Cl.
| | |
|---|---|
| *H04M 15/00* | (2006.01) |
| *H04W 8/20* | (2009.01) |
| *H04L 12/14* | (2006.01) |
| *H04W 4/24* | (2018.01) |

(52) U.S. Cl.
CPC ........ *H04M 15/07* (2013.01); *H04L 12/1471* (2013.01); *H04W 4/24* (2013.01); *H04W 8/20* (2013.01); *H04M 2215/64* (2013.01)

(58) Field of Classification Search
CPC ... H04M 15/07; H04M 2215/64; H04W 8/20; H04W 4/24; H04L 12/1471
See application file for complete search history.

(56) References Cited

U.S. PATENT DOCUMENTS

| | | | |
|---|---|---|---|
| 8,848,579 B1* | 9/2014 | Reeves | H04M 15/00 370/271 |
| 2002/0119766 A1* | 8/2002 | Bianconi | H04L 12/14 455/406 |
| 2004/0210522 A1* | 10/2004 | Bissantz | G06Q 20/10 705/40 |
| 2008/0119160 A1* | 5/2008 | Andriantsiferana | H04M 15/00 455/406 |

* cited by examiner

*Primary Examiner* — Minjung Kim
(74) *Attorney, Agent, or Firm* — Perkins Coie LLP

(57) ABSTRACT

The disclosed system provides a facility for split billing for a single user on multiple billing systems. The disclosed system activates the user on each respective billing system using a unique pairing, such as an international mobile subscriber identity that identifies the user, and a mobile station international subscriber directory number that identifies a particular user device. As device data is routed through a telecommunication network via each access point name (APN), the network generates call detail records (CDRs), which include an indication of the APN used. The CDRs are routed to a mediations platform that uses the received APN information to route each CDR to the appropriate target billing system. For example, CDRs identifying a APN may be routed to a telematics billing system, which then generates a bill that is sent to a car dealership.

18 Claims, 4 Drawing Sheets

US 10,560,581 B1

SPLIT BILLING FOR A USER ACROSS MULTIPLE BILLING SYSTEMS

BACKGROUND

In a typical telecommunications billing system, a user is activated on a single billing system where taxation, invoicing, and retail billing functions are performed and maintained. However, as embedded subscriber identity module (eSIM) and Internet of Things (IoT) technologies become more widespread, scenarios arise in which a single billing system is unable to adequately meet the needs of telecommunications service providers and end users. For example, a scenario in which a single user purchases a car having telematics capabilities (e.g., navigation or real-time monitoring of driver behavior) and infotainment capabilities (e.g., streaming multimedia such as movies or music to an electronic device installed inside of the car) could raise such concerns. This is particularly true if the telematics usage is charged under a first rate plan (e.g., a flat monthly fee) that is billed directly to a first party such as a car dealership or a car manufacturer, while the infotainment usage is charged under a second rate plan (e.g., a per-gigabyte fee) that is billed directly to a second party such as the user herself. Under traditional billing systems, a single bill would be generated and sent to only one party (e.g., the car dealership or the user), causing the party receiving the bill to manually coordinate payment with one or more other financially responsible parties. These and other problems exist with traditional billing systems. Therefore, a need exists to provide split billing for a user across multiple billing systems such that two or more individual parties may be billed separately for telecommunications services associated with a single user having multiple electronic devices.

DETAILED DESCRIPTION

A system for split billing for a single user on multiple billing systems is disclosed. For example, the disclosed system would enable a user's connected car to be associated with two billing systems: a first billing system that bills a car dealership (or other entity) for data used by a telematics device in the car; and a second billing system that bills the user herself for data used by an infotainment device in the car. Users are activated on a billing system which rates usage based on a rate-plan (e.g. 100 MB data for $4.99) with a unique pair being associated with each activated user. As described herein, the disclosed system extends the concept of user activation on a single billing system to activation across multiple billing systems such that differentiated or split billing can be achieved. The disclosed system activates the user on each respective billing system using a unique pairing, such as an international mobile subscriber identity (IMSI) and mobile station international subscriber directory number (MSISDN) pair. For example, the user may be activated using an IMSI-1/MSISDN-1 pair for a telematics billing system and an IMSI-1/MSISDN-2 pair for an infotainment billing system.

Figure 1:
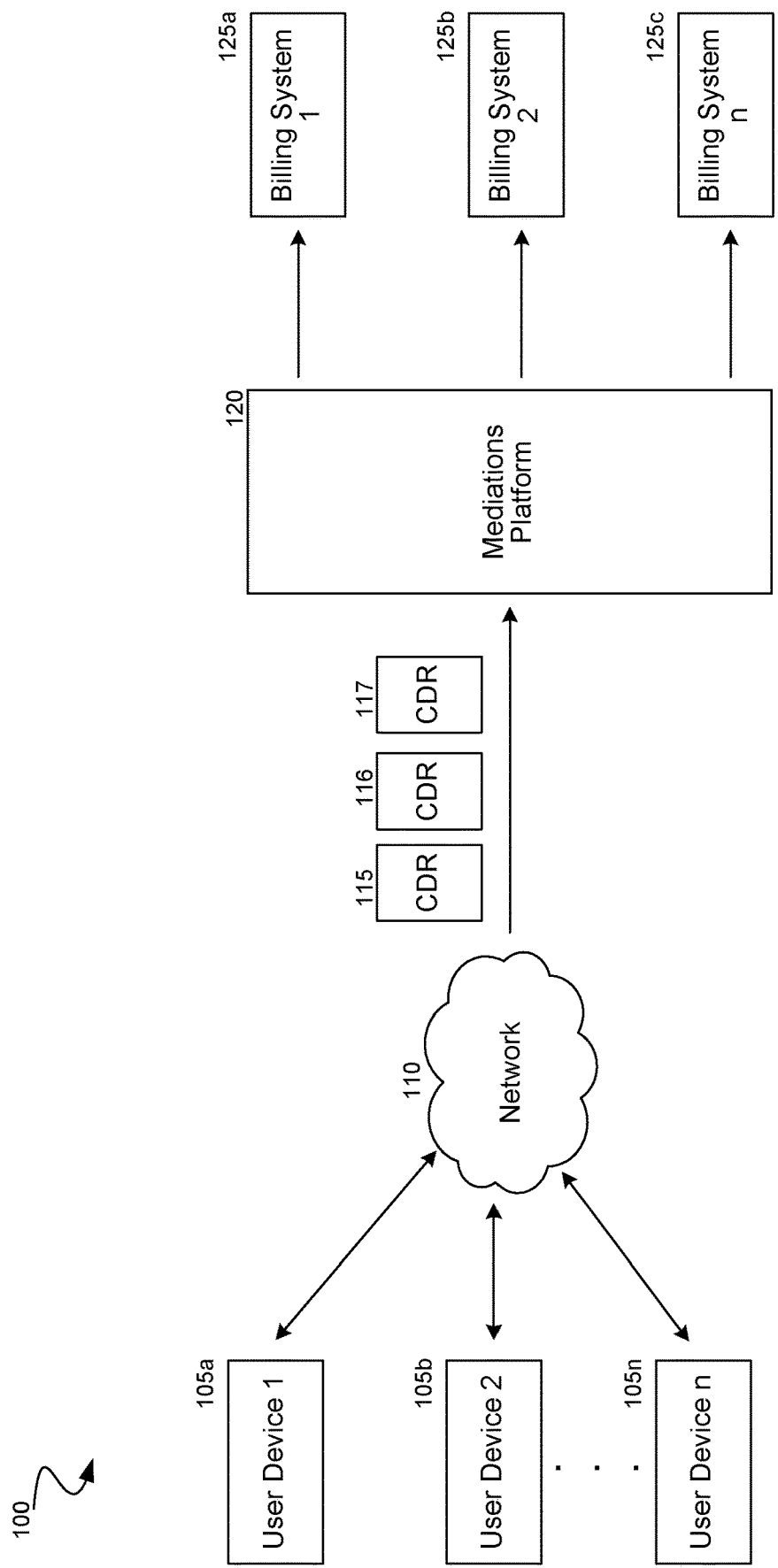
FIG. 1 is a diagram of a representative environment in which a system to provide split billing for a user across multiple billing systems may operate.

Each respective user device is configured to route data through a telecommunications network using a predetermined access point name (APN). An APN may correspond to a gateway connecting two networks (e.g., a 5G network and the public Internet) that was used to transmit or receive information from a respective user device 105a-105n (FIG. 1). For example, a telematics device may route data via APN-1 and an infotainment device may route data via APN-2. As user device data is routed via each APN, the network generates call detail records (CDRs) that each include an indication of the APN used. The CDRs are routed to a mediations platform that uses the received APN information to route each CDR to the appropriate billing system. For example, CDRs identifying APN-1 may be routed to a telematics billing system, which then generates a bill that is sent to a car dealership. Similarly, CDRs identifying APN-2 may be routed to an infotainment billing system, which then generates a bill that is sent directly to the user. Overall, the disclosed system allows different types of usage from the same device to be billed on two different billing systems for two potentially different entities.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment 100 in which a system to provide split billing for a user across multiple billing systems may operate. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

In the environment 100, user devices 105a-105n are associated with a single user, which may be a person or an entity who is a subscriber to services provided by a telecommunications service provider. Each of user devices 105a-105n may be any electronic device capable of sending or receiving data via network 110, as discussed in more detail below with respect to FIG. 2. Network 110 may be any network, including a telecommunications network, capable of facilitating the transfer of data between user devices 105a-105n, network 110, and one or more external application servers, websites, and/or computer systems (not shown). In one embodiment, network 110 may be an Internet Protocol Multimedia Subsystem (IMS) network. IMS is an architectural framework for delivering Internet Protocol ("IP") multimedia to mobile users, such as users of mobile devices like smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams.

Figure 2:
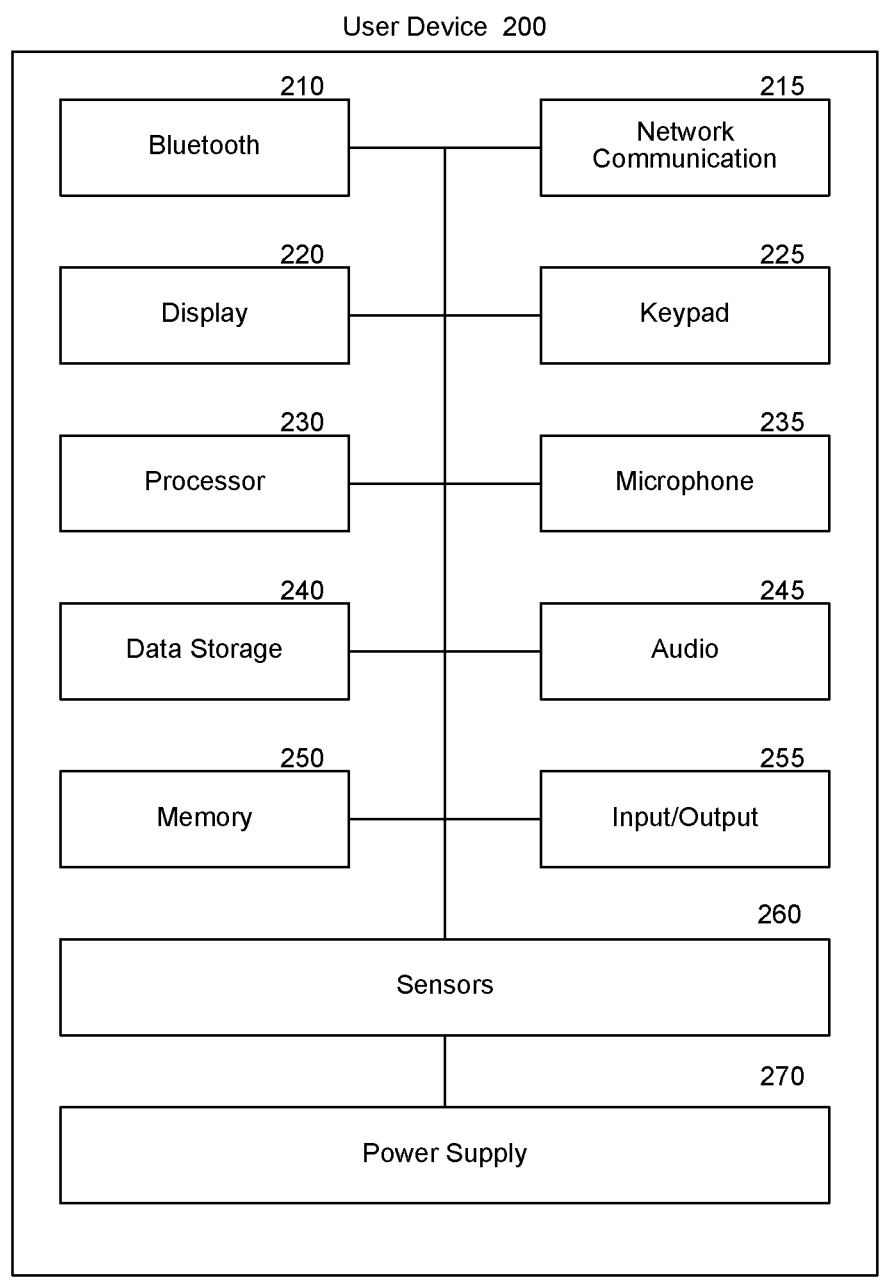
FIG. 2 is a representative block diagram of a user device in accordance with embodiments herein.

FIG. 2 is a representative block diagram 200 of a user device 105a-105n in accordance with embodiments herein. Each user device 105a-105n may include a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the user device to communicate by transmitting and receiving wireless signals using licensed, semi-licensed or unlicensed spectrum over a telecommunications network), an audio interface 245, a display 220, a keypad or keyboard 225, a microphone 235, one or more sensors 260 (e.g., accelerometers, speedometers, engine diagnostic sensors, etc.) that are used to facilitate particular functions of the electronic device, and other input and/or output interfaces 255. The various components of the user devices may be interconnected via one or more buses. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more Session Initiation Protocol (SIP) or Diameter protocol clients capable of generating, transmitting and interpreting syntactically correct SIP or Diameter protocol messages. SIP clients permit the mobile device to register with and communicate via networks such as IMS networks.

Each user device 105a-105n may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, infotainment systems, vehicle-mounted devices, Internet of Things (IoT) devices, and integrated devices combining one or more of the preceding devices, and/or the like.

Each user device 105a-105n may connect to a telecommunications network via a trusted radio access network (RAN) or an untrusted RAN. A single user device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Returning to FIG. 1, as user devices 105a-105n transmit and receive data via network 110, call detail records (CDRs) 115-117 are generated to enable the telecommunications system to track usage of each user device for billing purposes. A CDR is a data record that is produced by a component in a telecommunications network to capture details of transmissions to or from a user device on the network. A CDR may contain multiple attributes associated with the transmissions, such as time, duration, completion status, source number, destination number, sequence number, transmission type (e.g., telephone call, SMS message, MMS message, etc.), error or fault conditions, an associated user or subscriber identification, and/or routing information. In the disclosed system, example CDRs 115-117 are received by mediations platform 120 and processed as described herein.

The particular routing information contained in CDRs 115-117 may comprise Access Point Name (APN) information. As explained in more detail herein, the disclosed system may use APN information to help determine the particular billing system 125a-125c to which each received CDR should be routed. The source number information contained in each received CDR may comprise a mobile station international subscriber directory number (MSISDN) that is sufficient to uniquely identify a particular user device (e.g., user device 105a or user device 105b, etc.) associated with a data transmission. In addition, the associated user or subscriber information contained in each received CDR 115-117 may comprise an international mobile subscriber identity (IMSI) that is sufficient to uniquely identify a user who is associated with one or more respective user devices 105a-105n.

Mediations platform 120 receives each CDR 115-117 and determines which particular billing system 125a-125c is associated with each received CDR. On each billing system, the user is activated using a unique identification pairing so that each respective billing system can separately track and bill usage across multiple user devices 105a-105n that belong to the user. The unique identification pairing on each billing system may correspond to an IMSI/MSISDN pair that identifies the user and the user's respective device. The IMSI for a particular user may stay consistent across all of the multiple billing systems. By contrast, the MSISDN may be unique for each separate user device 105a-105n. For example, User A may own an automobile that contains two user devices: a telematics device 105a and an infotainment device 105b. A first billing system 125a may be responsible for generating bills for telematics usage. Therefore, User A has a primary activation on the first billing system 125a using an IMSI-1/MSISDN-1 pair, where IMSI-1 uniquely identifies User A while MSISDN-1 uniquely identifies telematics device 105a. In some embodiments, particularly embodiments in which the user device includes a SIM with a single profile, network usage will occur only with the IMSI-1/MSISDN-1 pair. Continuing the example, a second billing system 125b may be responsible for generating bills for infotainment usage (e.g. streaming music/audio/video service usage). Therefore, User A has a secondary activation on the second billing system 125b using an IMSI-1/MSISDN-2 pair, where IMSI-1 uniquely identifies User A while MSISDN-2 uniquely identifies infotainment device 105b. Subsequently, when each respective billing system receives a CDR from mediations platform 120, the billing system may read IMSI/MSISDN information from the CDR in order to track device usage, generate a bill, and send it to the appropriate user or party. In some embodiments, the MSISDN information used for a primary activation on a billing system may be transmitted to the corresponding user device, while in other embodiments the MSISDN information used for the primary activation may not be transmitted to the corresponding user device. In some embodiments, the MSISDN information for a secondary activation on a billing system may not be transmitted to the corresponding user device.

Mediations platform 120 is responsible for receiving a CDR, determining the specific billing system that should process the received CDR for billing purposes (i.e., the target billing system), modifying the received CDR if necessary in order to conform with a prior activation on the target billing system, and transmitting the CDR to the target billing system for processing. Mediations platform 120 uses a series of rules to determine how a received CDR should be processed and transmitted to a target billing system. To process received CDRs, mediations platform 120 may maintain one or more mediations tables that contain information necessary to route each received CDR to the appropriate respective billing system.

Various alternative embodiments are possible with the disclosed system, including embodiments wherein a first party is billed for usage associated with a first telematics device and a first infotainment device (per sample entries 325a and 325b, as explained below with reference to FIG. 3), and embodiments wherein a second party is billed for usage associated with a second telematics device and a second infotainment device (per sample entries 325c and 325d, as explained below with reference to FIG. 3). Still other various alternative embodiments are possible with the disclosed system.

Figure 3:
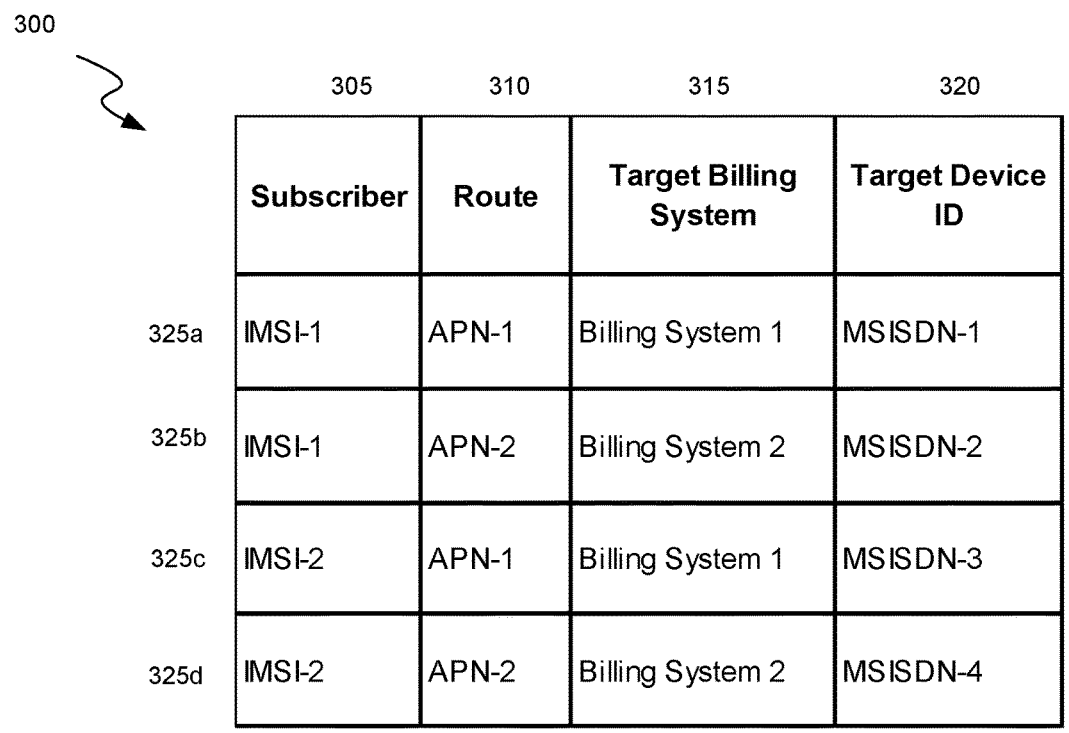
FIG. 3 depicts a first example mediations table that facilitates split billing in accordance with embodiments herein.

FIG. 3 depicts a first example mediations table 300 that facilitates split billing in accordance with embodiments herein. Each sample entry 325a-325d in mediations table 300 corresponds to a rule for determining how mediations platform 120 routes each received CDR to the appropriate target billing system. Mediations table 300 includes "Subscriber" column 305, "Route" column 310, "Target Billing System" column 315, and "Target Device ID" column 320. For each sample entry 325a-325d in mediations table 300, Subscriber column 305 contains an identifier that uniquely identifies a single user or telecommunications subscriber (e.g., User A). In an embodiment, the identifier contained in Subscriber column 305 comprises an IMSI of the associated user or telecommunications subscriber. In an embodiment, mediations platform 120 reads the IMSI from a received CDR and stores the IMSI in Subscriber column 305.

For each sample entry 325a-325d in mediations table 300, Route column 310 contains an identifier that uniquely identifies a route through which data passes in a telecommunications network. In an embodiment, mediations platform 120 reads the route data from a received CDR and stores the route data in route column 310. The route data stored in column 310 may comprise an identification of an APN that was used to route user device data through the telecommunications network. Each entry in Target Billing System column 315 contains an identifier that uniquely identifies a billing system to which a received CDR should be routed based on information contained in mediations table 300, as described in more detail below. Target Device ID column 320 contains an identifier that is unique to the user device that is associated with the received CDR. The identifier stored in Target Device ID column 320 is also the identifier initially used to activate the user device on the associated target billing system. Therefore, mediations platform 120 may alter the Target Device ID in the CDR before transmission to a target billing system to ensure that the Target Device ID is consistent with a previous activation on the target billing system.

Mediations table 300 includes sample entries 325a-325d which correspond to four sample rules that may be enforced by mediations platform 120 to determine the target billing system for a received CDR. According to sample entry 325a, when mediations platform 120 receives a CDR having a subscriber value of IMSI-1 (indicating, e.g., User A) and a Route value of APN-1 (indicating, e.g., telematics usage), then mediations platform 120 will transmit the received CDR to Billing System 1 (i.e., the desired or proper target billing system), where the CDR includes a subscriber value of IMSI-1 and a target device ID of MSISDN-1. As explained herein, Billing System 1 uses the IMSI-1/MSISDN-1 pair in the CDR received from mediations platform 120 to facilitate generating a bill for User A (corresponding to IMSI-1) for data usage of the user device corresponding to MSISDN-1 (e.g., a first telematics device).

According to sample entry 325b, when mediations platform 120 receives a CDR having a subscriber value of IMSI-1 (again indicating User A) and a Route value of APN-2 (indicating, e.g., infotainment usage), then mediations platform 120 will transmit the received CDR to Billing System 2 with a subscriber value of IMSI-1 and a Target Device ID of MSISDN-2. Mediations platform 120 transmits the CDR with the Target Device ID indicated in Target Device ID column 320, regardless of any device identification information present in the CDR as initially received. Billing System 2 uses the IMSI-1/MSISDN-2 pair in the CDR received from mediations platform 120 to facilitate generating a bill for User A (corresponding to IMSI-1) for data usage of the user device corresponding to MSISDN-2 (e.g., a first infotainment device).

According to sample entry 325c, when mediations platform 120 receives a CDR having a subscriber value of IMSI-2 (indicating, e.g., User B) and a Route value of APN-1, then mediations platform 120 will transmit the received CDR to Billing System 1 with a subscriber value of IMSI-2 and a target device ID of MSISDN-3. As explained herein, Billing System 1 uses the IMSI-2/MSISDN-3 pair in the CDR received from mediations platform 120 to facilitate generating a bill for User B (corresponding to IMSI-2) for data usage of the user device corresponding to MSISDN-3 (e.g., a second telematics device).

According to sample entry 325d, when mediations platform 120 receives a CDR having a subscriber value of IMSI-2 (again indicating User B) and a Route value of APN-2, then mediations platform 120 will transmit the received CDR to Billing System 2 (i.e., the target billing system) with a subscriber value of IMSI-2 and a Target Device ID of MSISDN-4. Mediations platform 120 transmits the CDR with the Target Device ID indicated in Target Device ID column 320, regardless of any device identification information present in the CDR as initially received. Billing System 2 uses the IMSI-2/MSISDN-4 pair in the CDR received from mediations platform 120 to facilitate generating a bill for User B (corresponding to IMSI-2) for data usage of the user device corresponding to MSISDN-4 (e.g., a second infotainment device).

Figure 4:
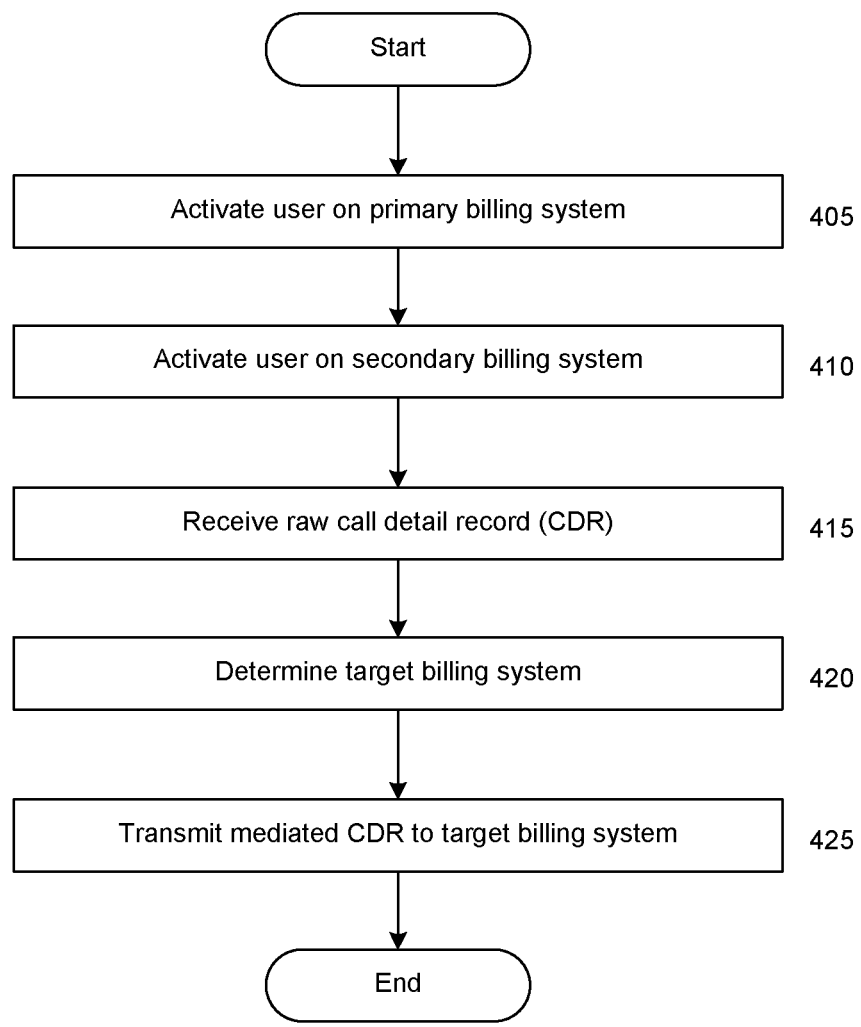
FIG. 4 is a flowchart showing a procedure for facilitating split billing for a user across multiple billing systems in accordance with embodiments herein.

FIG. 4 is a flowchart 400 showing a procedure for facilitating split billing for a user across multiple billing systems in accordance with embodiments herein. At block 405, a user is activated on a first billing system using a unique user identification (e.g., IMSI-1) and a unique user device identification for a first user device (e.g., MSISDN-1). At block 410, the same user is activated on a second billing system using the same unique user identification (e.g., IMSI-1) and a unique user device identification for a second user device (e.g., MSISDN-2). Although flowchart 400 only shows billing system activations at blocks 405 and 410, the disclosed system may complete any number of additional activations on additional, separate billing systems, and at different times. Each respective billing system on which the user is activated may bill for data usage under a different rate plan, and may generate and send bills or invoices to different parties for payment.

At block 415, mediations platform 120 receives a CDR associated with data usage from a user device and proceeds to block 420 to determine a target billing system associated with the received CDR. As explained herein, mediations platform 120 determines the target billing system for a received CDR based on information contained in the CDR and one or more rules maintained by mediations platform 120 in a mediations table 300. At block 425, the disclosed system transmits the received CDR to the target billing system in accordance with the rules maintained by mediations platform 120. As explained herein, the CDR that is transmitted to the target billing system contains at least a subscriber identifier (e.g., an IMSI) and a device identifier (e.g., a MSISDN) corresponding to a previous activation on the target billing system.

The disclosed system repeats blocks 415 through 425 for each CDR that is received as user devices consume data on a telecommunications network. At periodic intervals (such as at the end of a monthly billing cycle), each respective billing system generates a bill for the user based on the CDRs received by the respective billing system. Each respective billing system then sends the generated bills to the responsible financial party, which may be the user herself or a different party that is responsible for payment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A computer-implemented method for use with a wireless telecommunications network, the method comprising:
   receiving a first call detail record (CDR) associated with a wireless transmission of data to or from a first electronic device,
      wherein the received first call detail record comprises:
         a first identifier corresponding to the first electronic device;
         a second identifier corresponding to a user of the first electronic device; and
         a third identifier corresponding to a route by which the data was transmitted to or from the first electronic device;
   determining a first target billing system associated with the received first call detail record,
      wherein the determination of the first target billing system is based on at least the first identifier corresponding to the first electronic device, the second identifier corresponding to the user of the first electronic device, and the third identifier corresponding to the route by which the data was transmitted to or from the first electronic device;
   transmitting the received first call detail record to the determined first target billing system;
   receiving a second call detail record associated with a wireless transmission of data to or from a second electronic device,
      wherein the received second call detail record comprises:
         a first identifier corresponding to the second electronic device;
         a second identifier corresponding to a user of the second electronic device; and
         a third identifier corresponding to a route by which the data was transmitted to or from the second electronic device, and
      wherein the second identifier corresponding to the user of the first electronic device and the second identifier corresponding to the user of the second electronic device both correspond to the same user;
   determining a second target billing system associated with the received second call detail record,
      wherein the determination of the second target billing system is based on at least the first identifier corresponding to the second electronic device, the second identifier corresponding to the user of the second electronic device, and the third identifier corresponding to the route by which the data was transmitted to or from the second electronic device; and
   transmitting the received second call detail record to the determined second target billing system, thereby permitting split billing for a user across multiple billing systems.

2. The computer-implemented method of claim 1, wherein
   the determining a target billing system associated with the received first or second call detail record comprises:
   retrieving one or more split billing rules, wherein each retrieved rule indicates a target billing system to be used when the identifiers each match a predetermined value specified in the rule;
   identifying one of the one or more rules in which the identifiers each match the predetermined values specified in the identified rule; and
   determining the target billing system indicated by the identified rule.

3. The computer-implemented method of claim 1, wherein the method further comprises modifying the received first or second call detail record prior to transmitting the record to the determined target billing system, wherein the modifying includes changing the first identifier of the call detail record to a value that enables the determined target billing system to identify a predetermined activation on the billing system.

4. The computer-implemented method of claim 1, wherein the first identifier is a mobile station international subscriber directory number (MSISDN) and the third identifier identifies an access point network (APN).

5. The computer-implemented method of claim 1, wherein the second identifier is an international mobile subscriber identity (IMSI), and wherein the IMSI corresponding to the user of the first electronic device is the same IMSI corresponding to the user of the second electronic device.

6. The computer-method of claim 1, wherein the electronic device is a telematics device or an infotainment device.

7. A system configured for use with a wireless telecommunications network, the system comprising:
   at least one processor;
   at least one memory storing instructions, which when executed by the at least one processor, performs a method for:
      receiving a first call detail record (CDR) associated with a wireless transmission of data to or from a first electronic device,
         wherein the received first call detail record comprises:
            a first identifier corresponding to the first electronic device; and
            a second identifier corresponding to a user of the first electronic device;
      determining a first target billing system associated with the received first call detail record;
      transmitting the received first call detail record to the determined first target billing system;
      receiving a second call detail record associated with a wireless transmission of data to or from a second electronic device,
         wherein the received second call detail record comprises:
            a first identifier corresponding to the second electronic device; and a second identifier corresponding to a user of the second electronic device, and
wherein the second identifier corresponding to the user of the first electronic device and the second identifier corresponding to the user of the second electronic device both correspond to the same user;
determining a second target billing system associated with the received second call detail record; and
transmitting the received second call detail record to the determined second target billing system, thereby permitting split billing for a user across multiple billing systems.

8. The system of claim 7,
wherein the received first call detail record further comprises:
a third identifier corresponding to a route by which the data was transmitted to or from the first electronic device;
wherein the determination of the first target billing system is based on at least the first identifier corresponding to the first electronic device, the second identifier corresponding to the user of the first electronic device, and the third identifier corresponding to the route by which the data was transmitted to or from the first electronic device;
wherein the received second call detail record further comprises:
a third identifier corresponding to a route by which the data was transmitted to or from the second electronic device; and
wherein the determination of the second target billing system is based on at least the first identifier corresponding to the second electronic device, the second identifier corresponding to the user of the second electronic device, and the third identifier corresponding to the route by which the data was transmitted to or from the second electronic device.

9. The system of claim 8, wherein the determining a target billing system associated with the received first or second call detail record comprises:
retrieving one or more split billing rules, wherein each retrieved rule indicates a target billing system to be used when the identifiers each match a predetermined value specified in the rule;
identifying one of the one or more rules in which the identifiers each match the predetermined values specified in the identified rule; and
determining the target billing system indicated by the identified rule.

10. The system of claim 8, wherein the method further comprises modifying the received call detail record prior to transmitting the record to the determined target billing system, wherein the modifying includes changing the first identifier of the call detail record to a value that enables the determined target billing system to identify a predetermined activation on the billing system.

11. The system of claim 8,
wherein the first identifier is a mobile station international subscriber directory number (MSISDN),
wherein the second identifier is an international mobile subscriber identity (IMSI),
wherein the IMSI corresponding to the user of the first electronic device is the same IMSI corresponding to the user of the second electronic device, and
wherein the third identifier identifies an access point network (APN).

12. The system of claim 7, wherein the electronic device is a telematics device or an infotainment device.

13. A non-transitory computer-readable medium comprising instructions configured to cause one or more processors to perform a method for split billing for a user across multiple billing systems, the method comprising:
receiving a first data record and a second data record each associated with a transmission of data to or from a different electronic device of a user, wherein the first and second data records each comprise:
a first identifier corresponding to the respective electronic device;
a second identifier corresponding to the user; and
a third identifier corresponding to a route by which the data was transmitted to or from the respective electronic device;
determining, based on at least the respective first, second, and third identifiers, a first target billing system associated with the received first data record and a second target billing system associated with the received second data record;
transmitting the received first data record to the determined first target billing system;
transmitting the received second data record to the determined second target billing system; and
modifying the received data record prior to transmitting the record to the determined target billing system,
wherein the modifying includes changing the first identifier of the data record to a value that enables the determined target billing system to identify a predetermined activation on the billing system.

14. The non-transitory computer-readable medium of claim 13, wherein determining the first target billing system and the second target billing system comprises:
retrieving one or more split billing rules, wherein each retrieved rule indicates a target billing system to be used when the identifiers each match a respective predetermined value specified in the rule;
identifying one of the one or more rules in which the identifiers each match the respective predetermined values specified in the identified rule; and
determining the target billing system indicated by the identified rule.

15. The non-transitory computer-readable medium of claim 13, wherein the first identifier is a mobile station international subscriber directory number (MSISDN).

16. The non-transitory computer-readable medium of claim 13, wherein the second identifier is an international mobile subscriber identity (IMSI).

17. The non-transitory computer-readable medium of claim 13, wherein the third identifier identifies an access point network (APN).

18. The non-transitory computer-readable medium of claim 13, wherein the received data record is a call detail record (CDR), and further wherein the electronic device is a telematics device or an infotainment device.

* * * * *